United States Patent
Zhuang et al.

(10) Patent No.: US 10,313,172 B2
(45) Date of Patent: *Jun. 4, 2019

(54) SYSTEM AND METHOD FOR ENHANCED CHANNEL ESTIMATION USING TAP-DEPENDENT FREQUENCY OFFSET (FO) ESTIMATION

(71) Applicant: Samsung Electronics Co., Ltd., Gyeonggi-do (KR)

(72) Inventors: Binnan Zhuang, San Diego, CA (US); Jung Hyun Bae, San Diego, CA (US); Dongwoon Bai, San Diego, CA (US); Jungwon Lee, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,790

(22) Filed: Jan. 30, 2018

(65) Prior Publication Data

US 2018/0176064 A1 Jun. 21, 2018

Related U.S. Application Data

(63) Continuation of application No. 15/210,468, filed on Jul. 14, 2016, now Pat. No. 9,882,761.

(Continued)

(51) Int. Cl.
*H04K 1/10* (2006.01)
*H04L 27/26* (2006.01)
(Continued)

(52) U.S. Cl.
CPC ........ *H04L 27/2662* (2013.01); *H04L 7/0058* (2013.01); *H04L 25/022* (2013.01);
(Continued)

(58) Field of Classification Search
CPC ... H04L 27/2662; H04L 7/0058; H04L 7/033; H04L 25/022; H04L 25/025; H04L 25/0256
(Continued)

(56) References Cited

U.S. PATENT DOCUMENTS 6,359,938 B1 3/2002 Keevill
6,463,266 B1 10/2002 Shohara
(Continued)

FOREIGN PATENT DOCUMENTS

WO WO 2009/107071 9/2009
WO WO 2010/145176 12/2010

OTHER PUBLICATIONS

Y. Jianing et al., Time-domain channel estimation for aeronautical OFDM system with impulsive interference, 2015 IEEE/AIAA 34th Digital Avionics SystemsConference (DASC), Sep. 13, 2015, 8 Pages.
(Continued)

*Primary Examiner* — Helene E Tayong
(74) *Attorney, Agent, or Firm* — The Farrell Law Firm, P.C.

(57) ABSTRACT

A user equipment (UE) for channel estimation in a high-speed single-frequency network (HS-SFN) is provided. The UE includes at least one non-transitory computer-readable medium; and at least one processor, which, when executing instructions stored on the at least one non-transitory computer-readable medium, causes the UE to perform a method including calculating an estimated frequency offset (FO) correction for a received signal using at least an FO estimation generated by an automatic frequency control (AFC) module using at least a previously-calculated channel estimate output from a channel estimator (CE) as input in a first feedback loop; and calculating, by the CE, a current channel
(Continued)

estimate using at least the received signal adjusted by the estimated FO correction from the first feedback loop and one or more channel parameter estimates generated by the AFC using at least the previously-calculated channel estimate output from the CE as input in a second feedback loop.

10 Claims, 8 Drawing Sheets

Related U.S. Application Data

(60) Provisional application No. 62/304,863, filed on Mar. 7, 2016, provisional application No. 62/332,830, filed on May 6, 2016.

(51) Int. Cl.
  *H04L 25/02* (2006.01)
  *H04L 7/00* (2006.01)
  *H04L 7/033* (2006.01)

(52) U.S. Cl.
  CPC ........ *H04L 25/025* (2013.01); *H04L 25/0256* (2013.01); *H04L 7/033* (2013.01)

(58) Field of Classification Search
  USPC .......................................................... 375/260
  See application file for complete search history.

(56) References Cited

U.S. PATENT DOCUMENTS

| | | |
|---|---|---|
| 7,123,670 B2 | 10/2006 | Gilbert et al. |
| 7,310,394 B2 | 12/2007 | Wang |
| 7,907,683 B2 | 3/2011 | Merched et al. |
| 8,027,399 B2 | 9/2011 | Gore et al. |
| 8,139,667 B2 | 3/2012 | Manakkal et al. |
| 8,351,526 B2 | 1/2013 | Butussi et al. |
| 8,406,319 B2 | 3/2013 | Sayana et al. |
| 8,416,759 B1 | 4/2013 | Narasimhan et al. |
| 8,428,163 B2 | 4/2013 | Kent et al. |
| 8,494,070 B2 | 7/2013 | Luo et al. |
| 8,619,746 B2 | 12/2013 | Beckman et al. |
| 8,706,785 B2 | 4/2014 | Sorokine et al. |
| 2006/0233153 A1 | 10/2006 | Cheng |
| 2008/0089443 A1 | 4/2008 | Sanada |
| 2010/0222001 A1 | 9/2010 | Sangary |
| 2010/0279643 A1 | 11/2010 | Maruta |
| 2011/0116438 A1 | 5/2011 | Tsunekawa |
| 2011/0286376 A1 | 11/2011 | Yoo et al. |
| 2012/0188994 A1 | 7/2012 | Palanki et al. |
| 2012/0207110 A1* | 8/2012 | Miao ................ H04B 7/024 370/329 |
| 2012/0257568 A1 | 10/2012 | Cai |
| 2014/0135025 A1 | 5/2014 | Yoo et al. |
| 2014/0219397 A1 | 8/2014 | Chen |

OTHER PUBLICATIONS

S. Moon et al., Novel channel estimation scheme in fast fading channel applied to sidehaul system, Proceeding Spects '15, Proceedings of the International Symposium on Performance Evaluation of Computer and Telecommunication Systems, Jul. 1, 2015, pp. 1-6.

M.I.Cheema et al., A low complexity fine timing offset and channel estimation algorithm for cooperative diversity OFDM system,2011 International Conference on Communications and Information Technology (ICCIT), Mar. 29, 2011, 5 Pages.

* cited by examiner

SYSTEM AND METHOD FOR ENHANCED CHANNEL ESTIMATION USING TAP-DEPENDENT FREQUENCY OFFSET (FO) ESTIMATION

PRIORITY

This continuation application claims priority under 35 U.S.C. § 120 to a U.S. Patent Application filed on Jul. 14, 2016 in the United States Patent and Trademark Office (USPTO) and assigned U.S. Ser. No. 15/210,468, which claimed priority under 35 U.S.C. § 119(e) to a U.S. Provisional Patent Application filed on Mar. 7, 2016 in the USPTO and assigned Ser. No. 62/304,863, and a U.S. Provisional Patent Application filed on May 6, 2016 in the USPTO and assigned Ser. No. 62/332,830, the entire contents of each of which are incorporated herein by reference.

FIELD

The present disclosure relates generally to communication systems, and more particularly, to a system and method for enhanced channel estimation using tap-dependent frequency offset (FO) estimation.

BACKGROUND

In an increasing number of countries, ground transportation moves at speeds over than 300 km/h, e.g., Japan Tohoku Shinkansen (320 km/h), German Intercity-Express (ICE) (330 km/h), Automotrice Grande Vitesse (AGV) Italo (400 km/h), and Shanghai Maglev (430 km/h). Accordingly, an increasing number of mobile terminals are used in such high speed environments. However, in the $3^{rd}$ Generation Partnership Project (3GPP) specifications, e.g., Evolved Universal Terrestrial Radio Access (E-UTRA), performance of communication is only guaranteed up to a maximum speed of 350 km/h. Because of this, 3GPP initiated a new study item concerning performance enhancement in high speed scenarios. See RP-142307, 3GPP TSG RAN Meeting #66, Maui, Hi., Dec. 8-12, 2014, the contents of which are incorporated herein by reference.

In this effort, various channel models have been proposed and tested/simulated. See, e.g., R4-150122, "New channel mode for SFN deployment", Huawei; R4-150540, "Channel model for high speed train", Mediatek; and R4-150554, "High speed train scenarios", CMCC, each of which was presented at TSG RAN WG4 Meeting #74 in Athens, Greece, Feb. 9-13, 2015, and each of which is incorporated herein in its entirety. FIG. 1 illustrates a diagram of a high speed (HS) single frequency network (SFN), according to one embodiment of the present disclosure. FIG. 1 is based on FIG. 1 of R4-150122.

In FIG. 1, a high speed train 101 travels on tracks 110 where a series of remote radio heads (RRHs, labelled RRUs in drawing) run parallel with the tracks 110. In the system, a plurality of NRRHs are connected by fiber optics to form a single cell: RRU 121 to RRU (N) for cell 120 and RRU 131 to RRU (N) for cell 130. As can be seen in FIG. 1, a user equipment (UE) on train 101 passing by several RRHs is affected by the rapid changes of frequency due to Doppler shift as well as experiencing a time-varying multipath channel. In other words, the UE will experience a superposition of signals coming from the multiple RRHs, and, since the UE is rapidly moving along the railway, signal properties such as Doppler shift, time delay, and tap power will be dynamically changing. In such a HS-SFN scenario, traditional time domain channel interpolation schemes, such as linear interpolation and minimum mean-square error (MMSE) estimation based on Jake's model perform badly.

SUMMARY

Accordingly, the present disclosure aims at addressing to address at least the problems and/or disadvantages described above and to provide at least the advantages described below.

According to an aspect of the present disclosure, channel estimation quality is improved in situations where different channel taps have different Doppler shifts. When in a high speed (HS) single frequency network (SFN), such as a user equipment (UE) on a high speed train, the present disclosure provides frequency tracking and channel interpolation/estimation methods, apparatuses, and systems which improve communications in general. According to another aspect of the present disclosure, tap-dependent frequency offset (FO) estimation provides enhanced performance of frequency tracking. According to another aspect of the present disclosure, using tap-dependent FO estimation results provides enhanced performance of channel estimation/interpolation.

According to an aspect of the present disclosure, a UE capable of channel estimation in an HS-SFN is provided. The UE includes at least one non-transitory computer-readable medium; and at least one processor, which, when executing instructions stored on the at least one non-transitory computer-readable medium, causes the UE to perform a method including calculating an estimated FO correction for a received signal using at least an FO estimation generated by an automatic frequency control (AFC) module using at least a previously-calculated channel estimate output from a channel estimator (CE) as input in a first feedback loop; and calculating, by the CE, a current channel estimate using at least the received signal adjusted by the estimated FO correction from the first feedback loop and one or more channel parameter estimates generated by the AFC using at least the previously-calculated channel estimate output from the CE as input in a second feedback loop.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
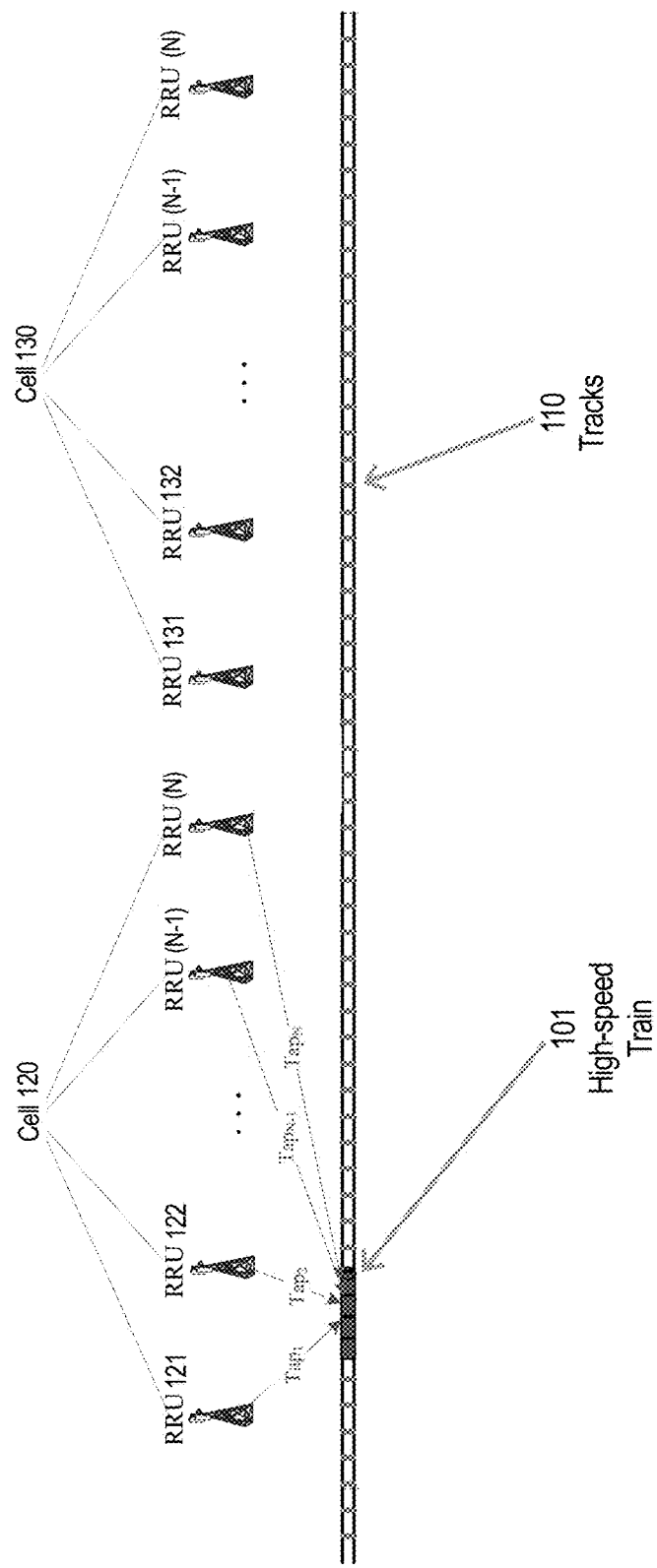
FIG. 1 illustrates a diagram of a high speed (HS) single frequency network (SFN) scenario, according to an embodiment of the present disclosure.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification do not necessarily refer to the same embodiment.

Figure 2:
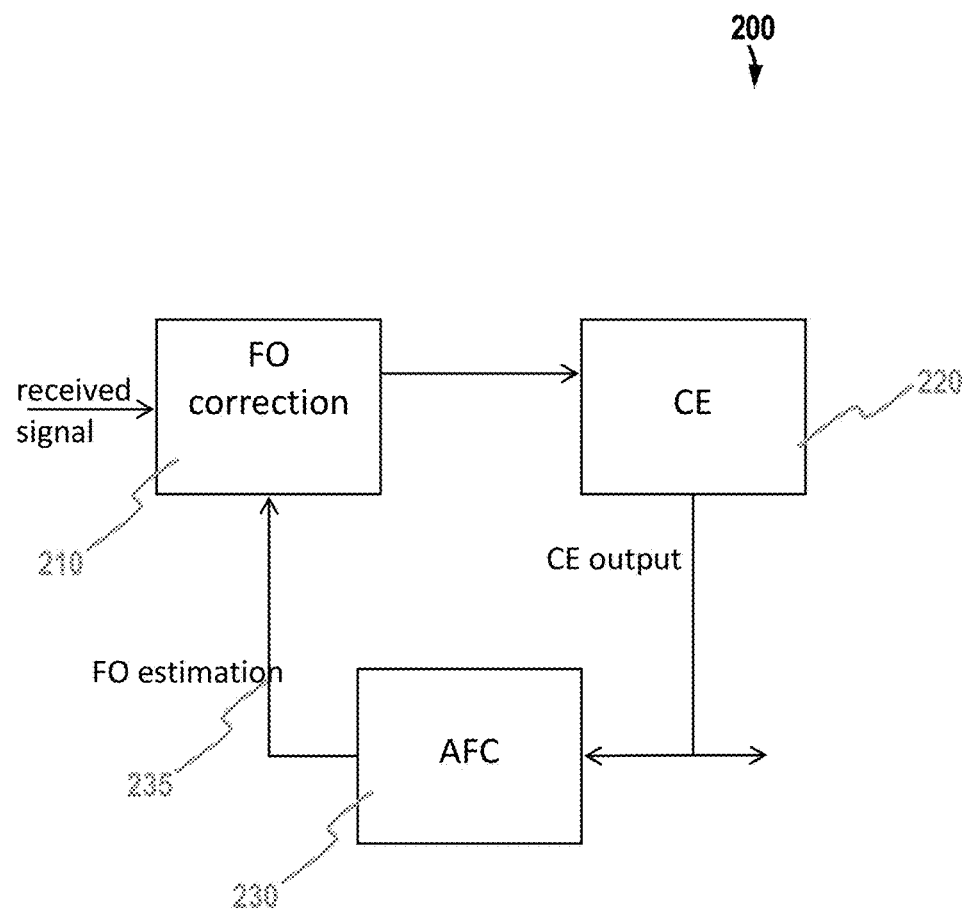
FIG. 2 illustrates a block diagram of a system for performing channel estimation in an HS-SFN scenario, according to an embodiment of the present disclosure.

FIG. 2 illustrates a block diagram of a system for performing channel estimation, according to an embodiment of the present disclosure. A system 200 includes a frequency offset (FO) correction module 210, a channel estimation (CE) module 220, and an automatic frequency control (AFC) module 230. The FO correction module 210 provides an estimated frequency offset ("FO estimation") 235 to a received signal and outputs a frequency-offset signal to the CE module 220. The CE module 220 calculates a channel estimate (CE) output based on the frequency-offset signal. The AFC module 230 receives the CE output from the CE module 220 and determines the estimated FO 235 for a subsequent received signal.

Due to per-tap Doppler shift (as illustrated in FIG. 1), an HS-SFN channel, such as the high speed train scenario channel, behaves in the frequency domain like a sum of exponential functions over time. See RP-142307, 3GPP TSG RAN Meeting #66, Maui, Hi., Dec. 8-12, 2014. Accordingly, as stated above, traditional channel interpolation methods, such as linear interpolation and minimum mean-square error (MMSE) estimation/interpolation assuming Jake's channel model, cannot provide sufficiently accurate channel estimation, leading to significant performance degradation. One cause of this bad performance in HS-SFN scenarios is the conventional phase locked loop (PLL) used for frequency tracking in receivers.

Accordingly, methods, systems, and apparatuses are needed to improve reception by a receiver of signals with dynamically changing properties, such as Doppler shift, time delay, and power, such as in an HS-SFN scenario (e.g., a UE carried by a user on a high speed train).

Embodiments of the present disclosure are directed to improving the quality of channel estimation when different channel taps have different Doppler shifts, such as is the case in FIG. 1, where a user equipment (UE) is on a train moving at high speed on a track with remote radio heads (RRHs). Channel interpolation methods as well as frequency tracking methods that utilize per-tap frequency offset estimations are described herein.

Figure 3:
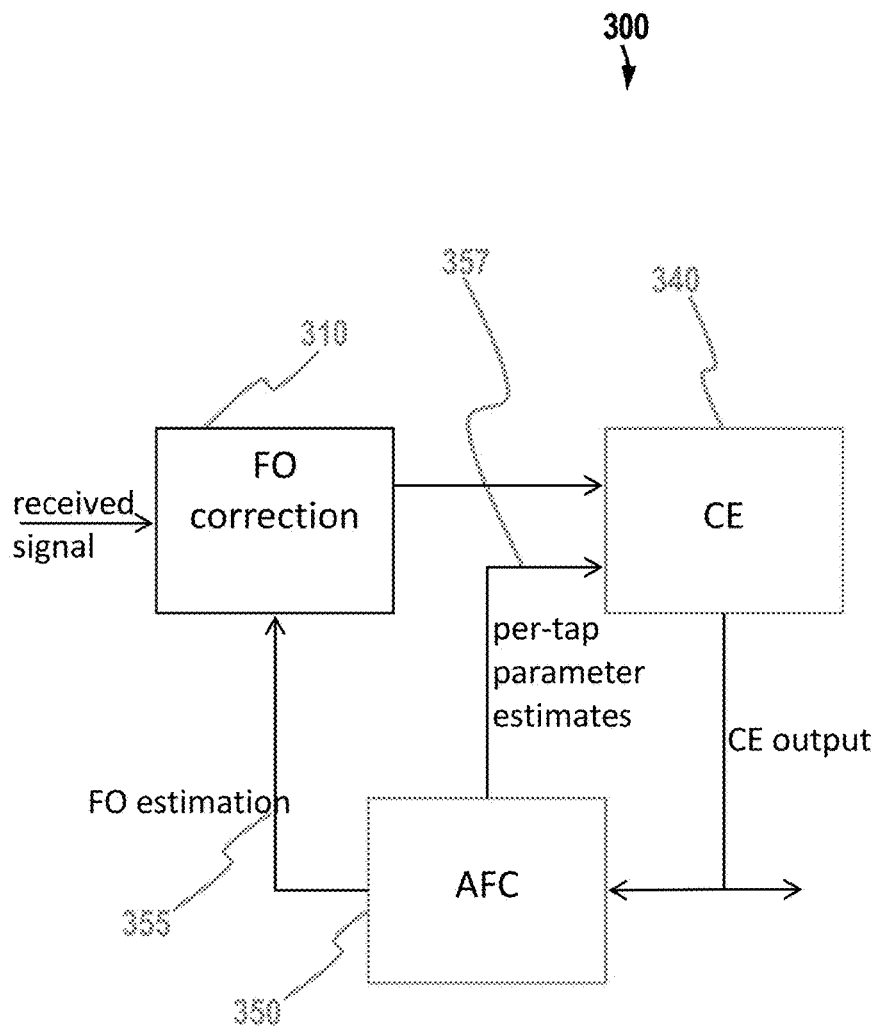
FIG. 3 illustrates a block diagram of a system for performing channel estimation in an HS-SFN scenario, according to another embodiment of the present disclosure.

FIG. 3 illustrates a block diagram of a system for performing channel estimation, according to an embodiment of the present disclosure. A system 300 includes a frequency offset (FO) correction module 310, a channel estimation (CE) module 340, and an enhanced automatic frequency control (AFC) module 350. The CE module 340 receives one or more per tap parameter estimates 357 from the AFC module 350, thereby improving the quality of channel estimation. The AFC module 350 provides feedback loop feeding parameter estimates 357 back to the CE module 340 in addition to providing feedback loop feeding FO estimations 355 to the FO correction module 310.

The CE module 340 and the AFC module 350 respectively include improvements for channel estimation/interpolation and frequency tracking, according to embodiments of the present disclosure. The improvements to channel estimation/interpolation and frequency tracking may be implemented separately. Although discussed as examples, implementations of the present disclosure are not necessarily limited to UEs on high speed trains or environments, but can rather be applied anywhere when tap delays have Doppler effects which are sufficiently different than traditional approaches are inaccurate, inefficient, and/or overly complex.

The present CE module includes three types of channel estimation schemes to improve the channel estimation (CE) quality for HS-SFN channels. According to one embodiment, the present CE module provides time domain (TD) tap-dependent interpolation, TDI. To estimate the channel on the kth subcarrier in the lth orthogonal frequency domain multiplexing (OFDM) symbol, the raw frequency domain (FD) channel values on the kth subcarrier in M OFDM symbols are interpolated. The interpolation coefficients are calculated based on per-tap frequency offset estimations. The interpolation coefficients are not subcarrier dependent, i.e., the same set of coefficients are reused for channel estimations of all the subcarriers in the same OFDM symbols.

According to another embodiment, the present CE module provides MMSE estimation using channel impulse response (CIR), MMSE-CIR. In the CIR domain, each channel tap can be estimated independently using the raw CIRs from adjacent OFDM symbols. The MMSE combining weights for each tap can be calculated using estimations of per-tap frequency offset, per-tap channel power, and noise variance. To perform MMSE-CIR, per-tap delay also needs to be estimated to identify tap locations.

According to another embodiment, the present CE module provides MMSE estimation in frequency domain, MMSE-FD. Unlike TDI, which only uses the raw channel values of the corresponding subcarrier, MMSE-FD uses channel values of all the subcarriers in each OFDM symbol. The MMSE combining weights are subcarrier dependent. The weight calculation requires estimations of per-tap frequency offset, per-tap channel power, per-tap delay, and noise variance. To reduce the computation complexity, an approximate solution utilizes subsampled subcarriers instead of all subcarriers.

MMSE-CIR and MMSE-FD achieve both denoising and channel interpolation. TDI may be used after denoising preprocessing. TDI, MMSE-CIR, and MMSE-FD provide substantial UE performance enhancement in the high speed train scenario.

TDI estimates the least parameters in order to calculate the interpolation coefficients. TDI only needs per-tap frequency offset estimation, instead of a combination of per-tap frequency offset estimation, per-tap power estimation, and noise variance estimation required by the Wiener filter approach, such as that used in Huawei's RAN4 contribution R4-157700, which is incorporated herein in its entirety. Accordingly, TDI has lower complexity in terms of hardware implementation compared with the Wiener filter approach in R4-157700. Since TDI requires estimating less parameters per tap, TDI is more robust to estimation errors.

MMSE-CIR uses CIR as input, thus operating in a different domain compared with the Wiener filter approach. Being an MMSE estimation, MMSE-CIR is expected to have better CE quality than the Wiener filter approach, since it jointly performs denoising and interpolation.

MMSE-FD utilizes all the subcarriers to estimate the FD channel on each subcarrier, while the Wiener filter approach only uses the corresponding subcarrier. Hence, MMSE-FD provides better CE quality at the cost of increased complexity.

TDI, MMSE-CIR, and MMSE-FD can be applied to a channel model with an arbitrary number of taps.

Figure 7:
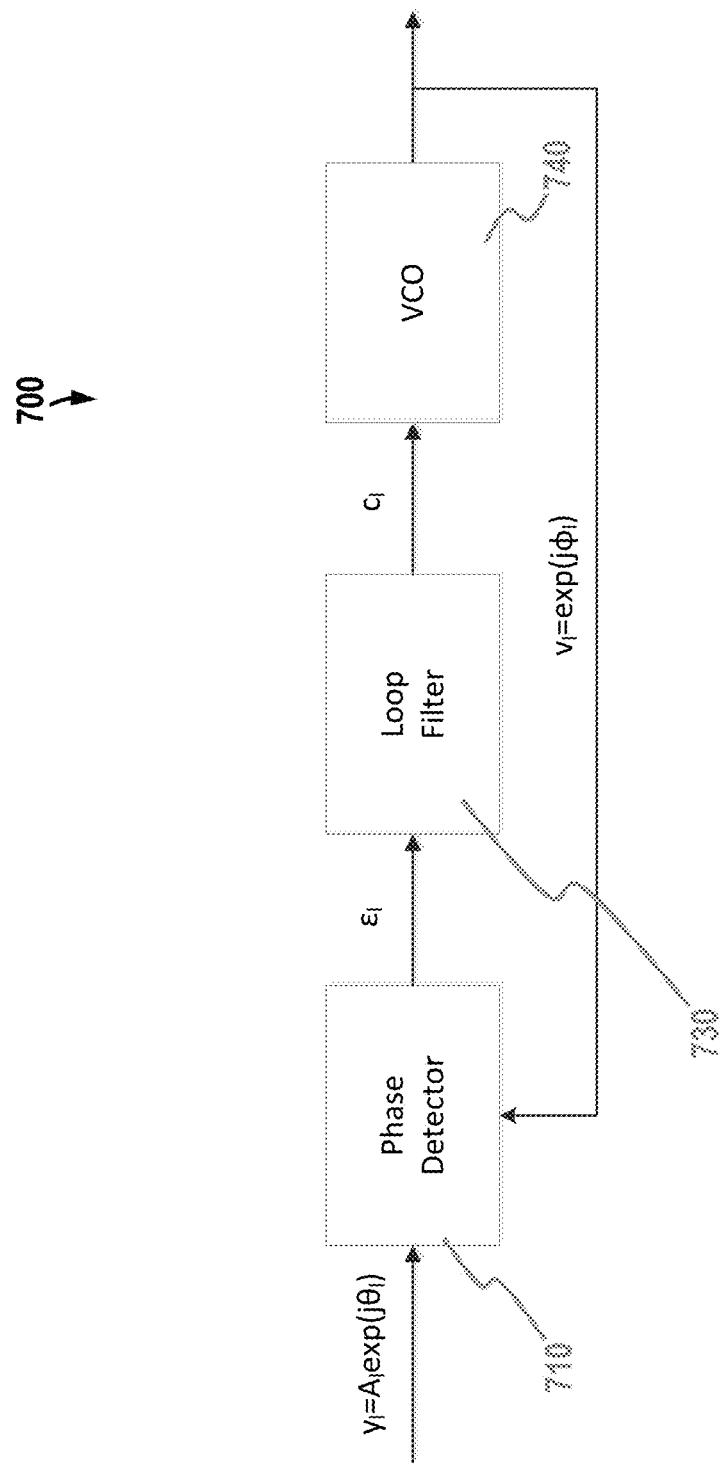
FIG. 7 illustrates a block diagram of a phase-locked loop (PLL), according to an embodiment of the present disclosure.
Figure 8:
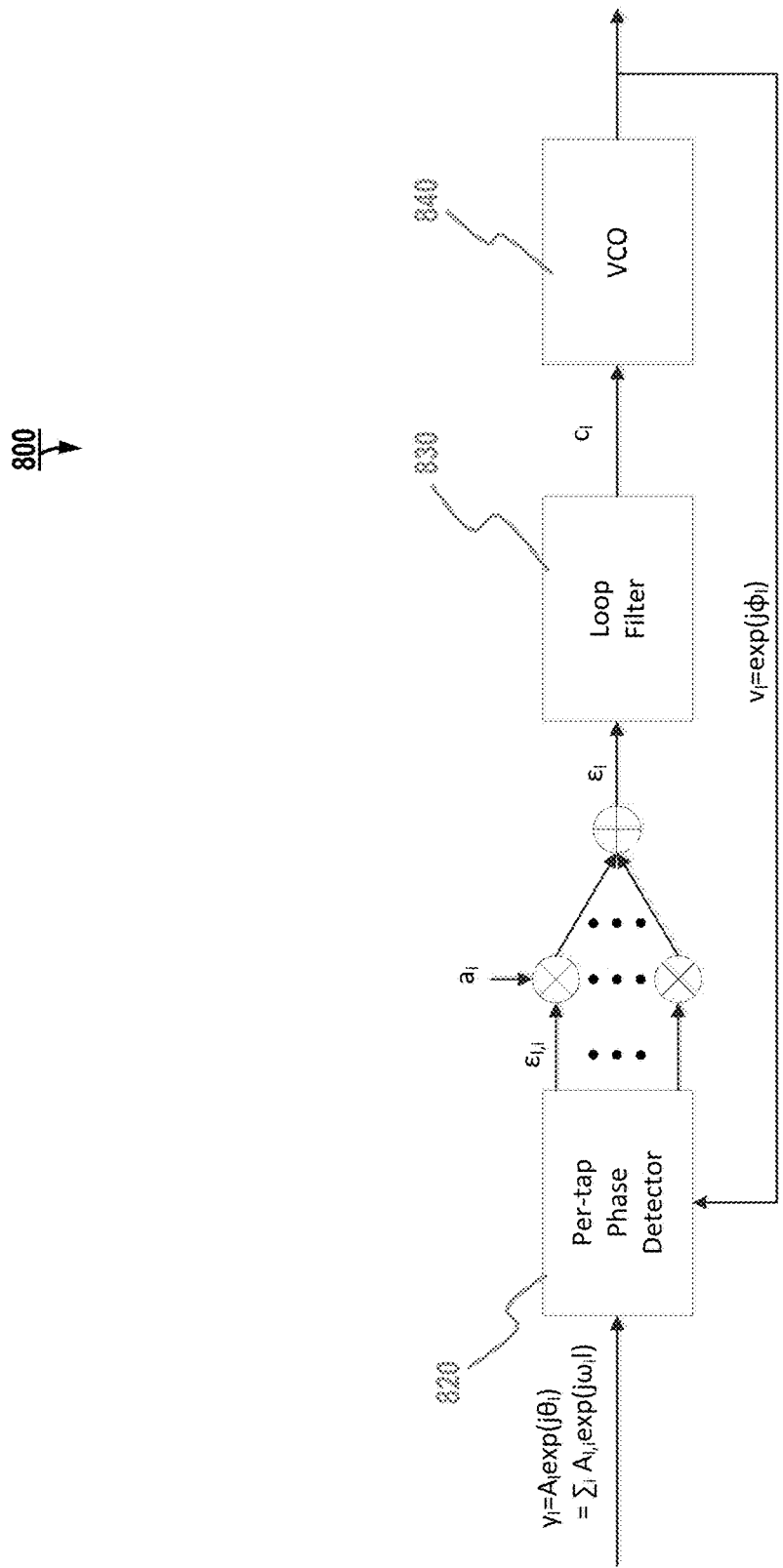
FIG. 8 illustrates a block diagram of a PLL structure for frequency tracking, according to an embodiment of the present disclosure.

In addition to the aforementioned improved channel interpolation methods, improved frequency tracking methods are also provided, in reference to FIGS. 7 and 8. Existing traditional frequency tracking algorithms assume an environment in which all channel taps have the same frequency offset. However, each channel tap has a specific frequency offset in the high speed train scenario, and hence, traditional frequency tracking algorithms do not perform well. In this disclosure, frequency tracking methods are provided in which output frequency is generated as a linear combination of per-tap frequency offsets of the channel. Accordingly, this disclosure provides a novel frequency tracking method which is not covered by traditional PLL methods. The frequency tracking methods of the present disclosure improve performance while maintaining the traditional channel interpolator structure. As discussed herein, channel interpolation using tap-dependent FO estimation according to the present disclosure provides performance enhancement.

The embodiments of the present disclosure described herein assume a KK-tap channel with per-tap frequency offset. The channel impulse response in the llth OFDM symbol is given by Equation (1):

$$h_l[n] = \sum_{i=0}^{K-1} g_i \delta[n-\tilde{\tau}_i] e^{j2\pi f_{d,i} l T_s} \quad (1)$$

where $g_i = \sqrt{p_i} e^{j\theta_i}$ is the initial complex gain of the ith tap, which includes both tap power $p_i$ and initial phase $\theta_i$; $\tilde{\tau}_i$ is the tap delay of the ith tap quantized to the time resolution; $f_{d,i}$ is the frequency offset of the ith tap; $T_s$ is the symbol duration. In the frequency domain, the corresponding channel on the kth subcarrier of the lth OFDM symbol is given by Equation (2):

$$H_l[k] = \sum_{i=0}^{K-1} \frac{1}{N} g_i e^{-j\frac{2\pi}{N} k \tilde{\tau}_i} e^{j2\pi f_{d,i} l T_s} \quad (2)$$

Derivations and detailed discussions of the equations herein can be found in U.S. Provisional Patent Application Ser. No. 62/230,863 from which this application claims priority and which has been incorporated herein by reference in its entirety (hereinafter, the '863 provisional).

Channel Estimation Approaches

TDI:

To estimate the K-tap channel, the TDI method requires channel values at M≥K OFDM symbols. These values can either be the raw channels, or obtained from pilot based initial channel estimation. The channel value of the kth subcarrier in the lth OFDM symbol may be represented as $\tilde{H}_l[k] = H_l[k] + U_l[k]$, where $U_l[k]$ is the error. The M initial estimations can be written as a M×1 vector, $\vec{H}[k] = [\tilde{H}_{l_0}[k], \ldots, \tilde{H}_{l_{M-1}}[k]]^T$. The interpolated channel on the lth OFDM symbol to be estimated is given by Equation (3):

$$\hat{H}_l[k] = \vec{P} \Sigma^{-1} \vec{H}[k] \quad (3)$$

where the 1×M vector $\vec{P}$ is given by Equation (3)(a):

$$\vec{P} = [e^{j2\pi f_{d,0}(l-l_0)T_s}, \ldots, e^{j2\pi f_{d,K-1}(l-l_0)T_s}] \quad (3)(a)$$

and where the M×K matrix Σ is given by Equation (3)(b):

$$\Sigma = \begin{bmatrix} 1 & \cdots & 1 \\ e^{j2\pi f_{d,0}(l_1-l_0)T_s} & \cdots & e^{j2\pi f_{d,K-1}(l_1-l_0)T_s} \\ \vdots & \ddots & \vdots \\ e^{j2\pi f_{d,0}(l_{M-1}-l_0)T_s} & \cdots & e^{j2\pi f_{d,K-1}(l_{M-1}-l_0)T_s} \end{bmatrix} \quad (3)(b)$$

When L>M, $\Sigma^{-1}$ needs to be computed using Moore-Penrose pseudoinverse. Derivations and detailed discussions of the TDI equations herein can be found in the '863 provisional.

Figure 4:
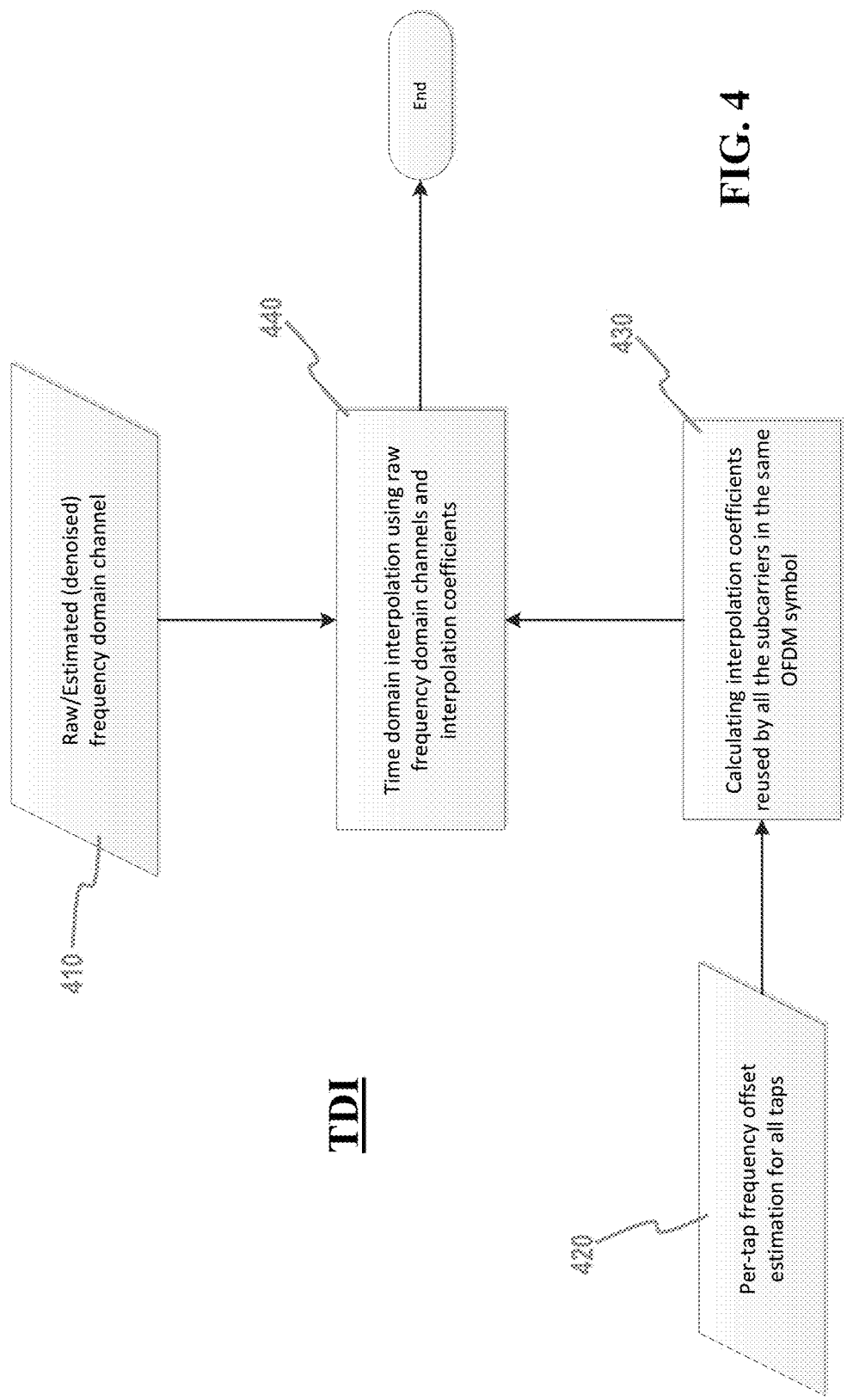
FIG. 4 illustrates a flow chart of a time domain tap-dependent interpolation (TDI) channel estimation method, according to an embodiment of the present disclosure.

FIG. 4 illustrates a flow chart of a TDI channel estimation method, according to an embodiment of the present disclosure. At 410, the present system receives a raw/estimated or denoised frequency domain channel. At 420, the present system calculates a frequency offset for each tap of a plurality of taps in each OFDM symbol. At 430, the present system calculates interpolation coefficients reused on all the subcarriers in the same OFDM symbol based on the per-tap frequency offsets. At 440, the present system performs time domain interpolation using the raw frequency domain channel from 410 and the interpolation coefficients from 430 to provide and output the channel estimates.

MMSE-CIR:

MMSE-CIR is based on raw channel impulse response in the time domain, which assumes the initial complex gains of different taps are independent complex Gaussian random variables, i.e., $g_i \sim CN(0,p_i)$. The noisy raw CIR in the lth OFDM symbol is represented in Equation (4) as:

$$\tilde{h}_l[n] = h_l[n] + u[n] \quad (4)$$
$$= \sum_{i=0}^{K-1} g_i \delta[n-\tilde{\tau}_i] e^{j2\pi f_{d,i} l T_s} + u[n]$$

where u[n] is the term representing the channel noise, which is assumed to be complex Gaussian. Hence, the MMSE estimation of the CIR in the lth OFDM symbol based on raw CIRs from M pilot OFDM symbols can be written as Equation (5):

$$\hat{h}_l[\tilde{\tau}_i] = \sum_{m=0}^{M-1} w_{i,l_m}[l] \tilde{h}_{l_m}[\tilde{\tau}_i], \quad i=0 \ldots K-1 \quad (5)$$

where $w_{i,l_m}[l]$ is the MMSE weight on the ith delay tap in the $l_m$th OFDM symbol, which is given by Equation (5)(a):

$$w_{i,l_m}[l] = \frac{p_i}{Mp_i + \sigma^2} e^{j2\pi f_{d,i}(l-l_m)T_s} \quad (5)(a)$$

To compute these MMSE weights, per-tap power $p_i$, per-tap frequency offset $f_{d,i}$ and noise variance $\sigma^2$ needs to be estimated. To perform the entire process, per-tap delay $\tilde{\tau}_i$ also needs to be estimated in order to eliminate the noise in the non-channel samples. Derivations and detailed discussions of the MMSE-FD equations herein can be found in the '863 provisional.

Figure 5:
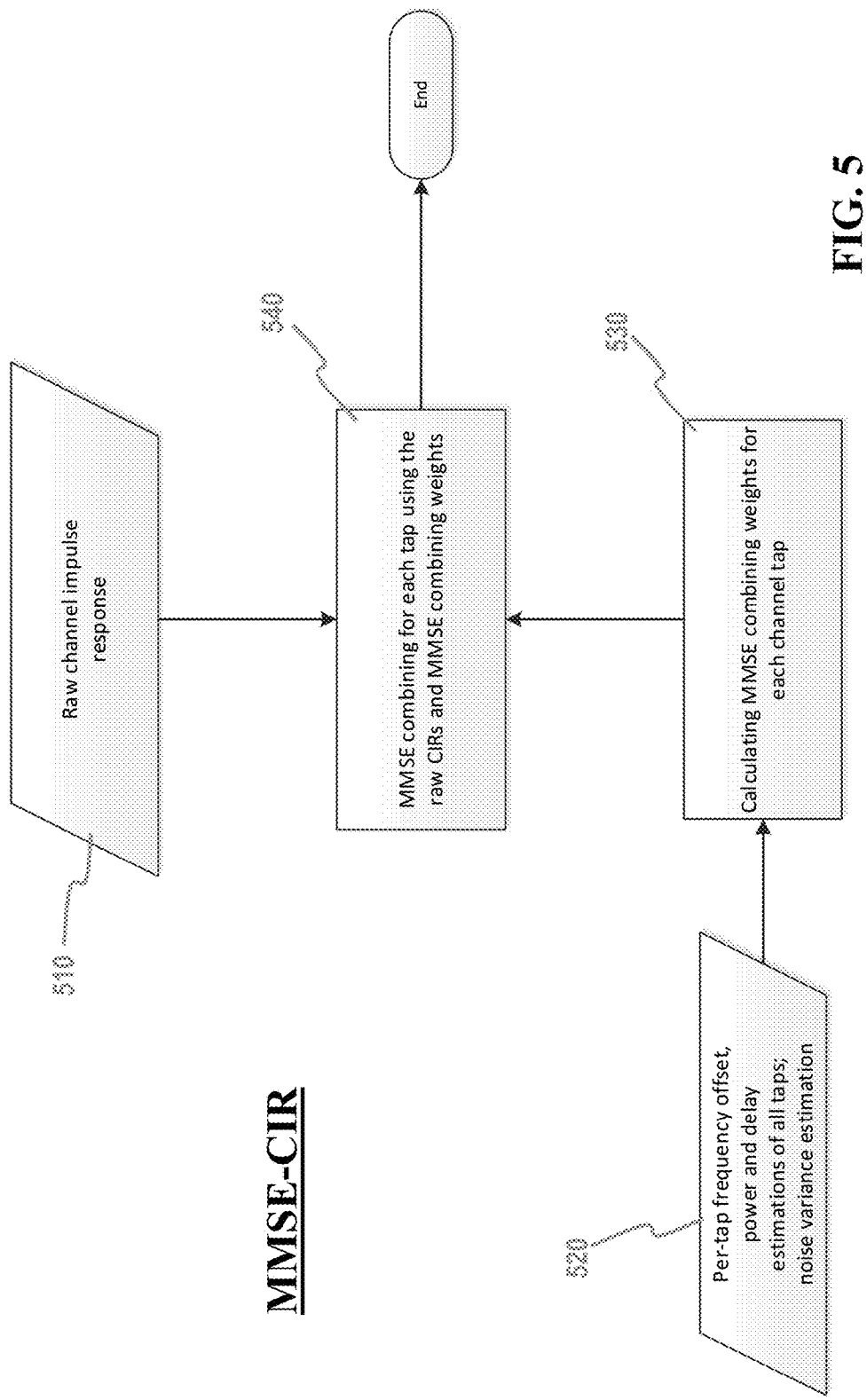
FIG. 5 illustrates a flow chart of an MMSE estimation method using channel impulse response (MMSE-CIR), according to an embodiment of the present disclosure.

FIG. 5 illustrates a flow chart of an MMSE estimation method using CIR, according to an embodiment of the present disclosure. At 510, the present system receives or determines a raw channel impulse response. At 520, the present system estimates (i) a per-tap power $p_i$, (ii) a per-tap frequency offset $f_{d,i}$, (iii) a per-tap delay $\tilde{\tau}_i$, and (iv) noise variance $\sigma^2$ for each tap of a plurality of taps in each OFDM symbol. At 530, the present system calculates MMSE combining weights for each tap using the information produced at 520. At 540, the present system performs MMSE combining for each tap using the raw channel impulse response from 510 and the MMSE combining weights from 530 to provide and output the channel estimates.

MMSE-FD:

The MMSE-FD is the equivalent implementation of MMSE-CIR in the frequency domain, as shown in Equation (6):

$$\hat{H}_l[k] = \frac{1}{N} \sum_{m=0}^{M-1} \sum_{q=0}^{N-1} [\tilde{H}_{l_m}[(k-q)_N] W_{l_m}[q]] \quad (6)$$

where $(k-q)_N$ means modular N computation and $W_{l_m}[q]$ is the MMSE weight on the $(k-q)_N$th subcarrier in the $l_m$th OFDM symbol, which is given by Equation (6)(a):

$$W_{l_m}[k] = \sum_{i=0}^{K-1} \frac{p_i}{Mp_i + \sigma^2} e^{j2\pi f_{d,i}(l-l_m)T_s} e^{-j\frac{2\pi}{N}\tau_i k} \quad (6)(a)$$

Analogous to TDI using CIR, the estimations of per-tap power $p_i$, per-tap frequency offset $f_{d,i}$, per-tap delay $\tilde{\tau}_i$ and noise variance $\sigma^2$ are needed to calculate the MMSE weights.

MMSE-FD uses all subcarriers in the M OFDM symbols to estimate the frequency domain channel of a single subcarrier, which is more complicated than TDI. However, in another embodiment of the present disclosure, an approximated implementation, which uses subsampled subcarriers to trade increased denoising power for reduced complexity, is described in the '863 provisional, as well as derivations and detailed discussions of the MMSE-FD equations herein.

Figure 6:
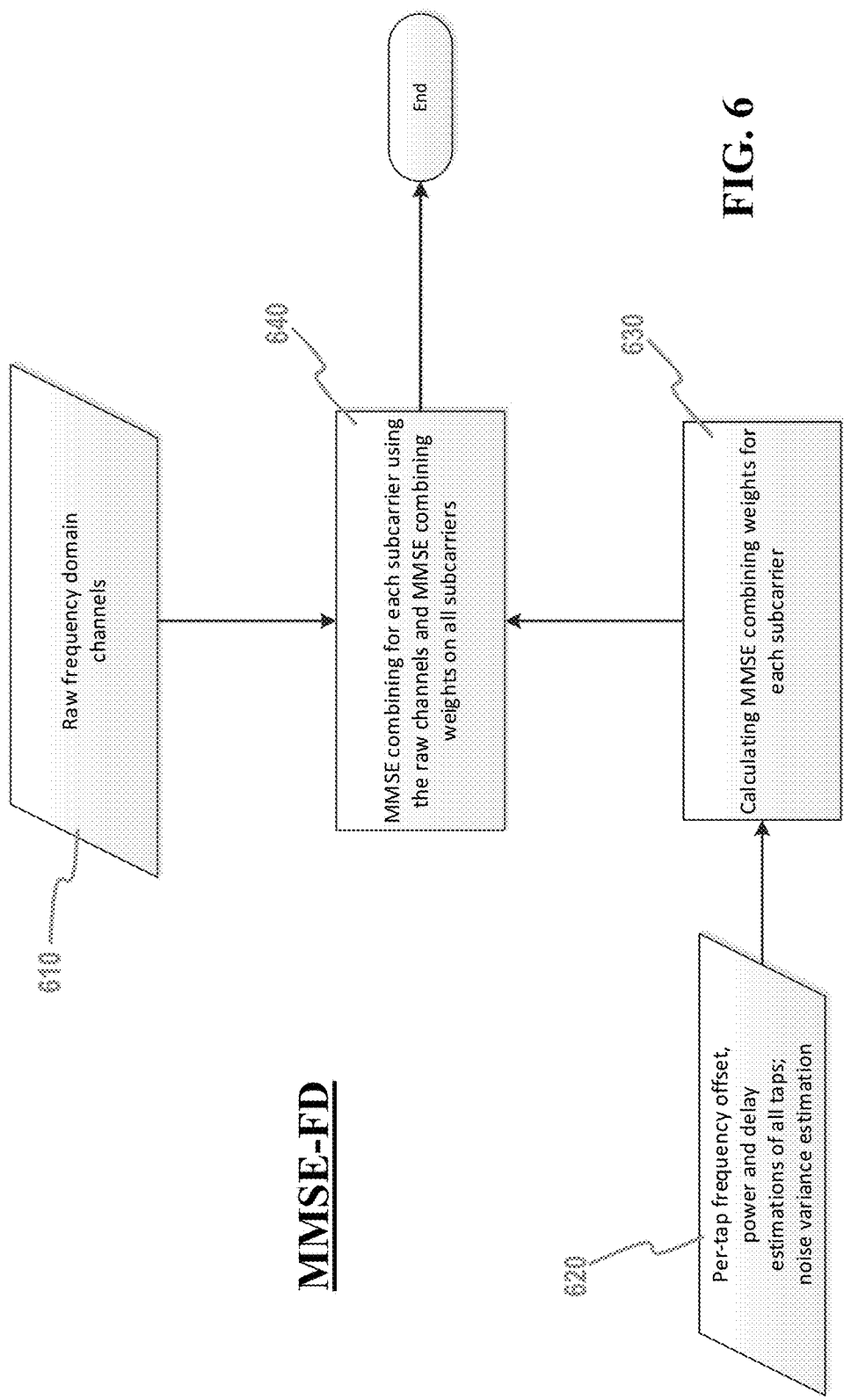
FIG. 6 illustrates a flow chart of an MMSE estimation method in the frequency domain (MMSE-FD), according to an embodiment of the present disclosure.

FIG. 6 illustrates a flow chart of an MMSE estimation method in the FD, according to one embodiment of the present disclosure. At 610, the present system receives or determines raw frequency domain channels. At 620, the present system estimates (i) a per-tap power $p_i$, (ii) a per-tap frequency offset $f_{d,i}$, (iii) a per-tap delay $\tilde{\tau}_i$, and (iv) noise variance $\sigma^2$ for each tap of a plurality of taps. At 630, the present system calculates MMSE combining weights for each subcarrier using the information produced at 620. At 640, the present system performs MMSE combining for each subcarrier using the raw frequency domain channels from 610 and the MMSE combining weights from 630 to provide and output the channel estimates.

Channel Tap-Dependent Frequency Tracking Approach

FIG. 7 illustrates a block diagram of a phase-locked loop (PLL), according to an embodiment of the present disclosure. A PLL 700 may provide frequency tracking for a typical receiver. The PLL 700 includes a phase detector 710, a loop filter 730, and a voltage-controlled oscillator 740.

In FIG. 7, PLL input $y_l$, where l=0,1,2, . . . , is the lth orthogonal frequency division multiplexing (OFDM) symbol as received can be represented as Equation (7)(a):

$$y_l = A_l e^{j\theta_l} \quad (7)(a)$$

where $A_l$ is the real-valued amplitude of the PLL input $y_l$, and $\theta_l$ is its phase. The phase detector 710 also receives as input $v_l$ that is feedback from the VCO 740 (i.e., the output from the PLL 700). The phase detector 710 generates $\varepsilon_l$ as output, which is proportional to the phase difference of the two input signals, PLL input $y_l$ and feedback input $v_l$, to the phase detector 710, e.g., $\varepsilon_l = \theta_l - \varphi_l$, where $\theta_l$ is the phase of PLL input $y_1$, and $\varphi_l$ is the phase of feedback input $v_l$. The main objective of the phase detector 710, which receives PLL input $y_l$ and feedback input $v_l$, is to maintain a constant output $\varepsilon_l = \theta_l - \varphi_l$. The phase detector 710 output $\varepsilon_l$ is filtered by the loop filter 730, whose output $c_l$ is processed by the VCO 740 to produce the PLL output $v_l$, which can be represented as Equation (7)(b):

$$v_l = e^{j\varphi l} \quad (7)(b)$$

The operation of the PLL 700 in FIG. 7 is ideal, and most practical PLLs cannot fulfill these objectives for any arbitrary incoming phase $\theta_l$. Typically, a frequency tracking PLL is designed using a normalized wavelength $\omega$ which can be thought of as a unit, in the sense that $\theta_l = \omega l$. A PLL can be designed to handle faster variations of $\theta_l$, using a normalized wavelength $\omega$ using the equation $\theta_l = \omega^2 l$ as a basis, but such a PLL is still not capable of handling arbitrary $\theta_l$, especially when $\theta_l$ is constantly changing at the tap level.

Accordingly, a typical PLL cannot keep $\varepsilon_l = \theta_l - \varphi_l$ constant in an HS-SFN environment, where, for example, the Doppler effect on the received frequency is much more extreme than normal, resulting in extremely rapid variations in $\theta_l$. In other words, the conventional PLL cannot handle an arbitrary $\theta_l$, or, equivalently, an HS-SFN scenario.

The frequency-domain channel $H_l[k]$ at the lth OFDM symbol used to drive the PLL can be represented by Equation (8):

$$H_l[k] = A_l[k] e^{j\omega l} \quad (8)$$

where $A_l[k]$ is the amplitude and $\omega$ is the normalized wavelength $\omega = 2\pi f_0 T_s$, in which $f_0$ is the frequency offset assuming all taps have the same frequency offset and $T_s$ is the symbol duration. However, if the taps have different frequency offsets, then, unlike the simplified ideal $A_l$ in Equation (7)(a), $A_l[k]$ in Equation (8) can be a complex number, which means that frequency-domain channel $H_l[k]$ cannot be directly input to the phase detector 710 in FIG. 7.

One approach for handling the possibly complex amplitude input is to compute an empirical correlation, using a formula such as Equation (9) below, and then using this computed empirical value as the phase detector input.

$$E[H_l[k]H^*_0[k]] = E[A_l[k]A^*_0[k]] e^{j\omega l} \quad (9)$$

where $H_0[k]$ is assumed as a reference channel in order to simplify computing the empirical correlation, where $H_0[k]$ will vary depending on implementation; where $A_0[k]$ is assumed as a reference amplitude in order to simplify computing the empirical correlation, where $A_0[k]$ will vary depending on implementation; and $E[\ ]$ is the expectation overall random channel realization.

In a typical wireless environment, $E[A_l[k]A^*_0[k]]$ can be expressed as $E[A_l[k]A^*_0[k]] = R_l e^{j\Delta\theta_l}$ where $R_l$ is real-valued and $\Delta\theta_l \approx 0$. Under Jake's channel model, $\Delta\theta_l = 0$. In an HS-SFN, each tap has different frequency offset. Using $\omega_i = 2\pi f_{d,i} T_s$ in Equation (2), the empirical correlation in Equation (9) can be simplified to Equation (10) below:

$$E[H_l[k]H^*_0[k]] \approx \Sigma_{i=0}^{K-1} p_i e^{j\omega_i l} \quad (10)$$

However, it is clear that this cannot be expressed as $R_l e^{j\omega l}$ where $R_l$ is real-valued, and, consequently, a conventional PLL using such an empirical correlation still fails to achieve its objective. This is the root cause of the significant performance degradation of conventional/existing channel interpolators/estimators discussed earlier.

The problem of performance degradation may be mitigated by modifying the channel interpolator/estimator. The present system and method provides modified PLL operation to allow the traditional interpolator/estimator to be maintained. Modifying the channel interpolator/estimator may be a better option performance-wise, while modifying the PLL operation by using channel tap-dependent frequency tracking may be a better option in terms of reducing implementation complexity.

FIG. 8 illustrates a block diagram of a PLL structure for frequency tracking, according to an embodiment of the present disclosure. The PLL 800 includes a phase detector 810, a loop filter 830, and a voltage-controlled oscillator 840.

In FIG. 8, PLL input $y_l$, the lth OFDM symbol as received, is processed as the sum of K taps, with index i=0, 1, 2, ..., K−1, as represented by the third form in Equation (11):

$$y_k = A_l e^{j\theta_l} = \Sigma_{i=0}^{K-1} A_{l,i} e^{j\omega_i l} \quad (11)$$

where $A_{l,i}$ is the real-valued amplitude at tap i of the PLL input symbol $y_l$, and $\omega_i l$ is the phase at tap i of the PLL input symbol $y_l$.

The determination/identification of the K terms may be performed in a variety of ways, as is well-known to those of ordinary skill in the art. Such well-known methods include, but are not limited to, multiple signal classification (MUSIC) and estimation of signal parameters via rotational invariance techniques (ESPRIT). Once each term is identified, i.e., $p_i e^{j\omega_i l}$ is identified for each i, phase detection may be performed on each tap i in the same manner as the phase detection was performed on the entire symbol $y_l$ in the traditional PLL of FIG. 7.

Accordingly, the per-tap phase detector 820 performs (i) the identification of the K terms in accordance with, for example, $E[H_l[k]H^*_0[k]] \approx \Sigma_{i=0}^{K-1} p_i e^{j\omega_i l}$ and (ii) acquires and outputs each of $\varepsilon_{l,i}$ in parallel where i=0, 1, 2, ..., K−1 taps. These parallel $\varepsilon_{l,i}$ are summed to produce $\varepsilon_l$ as represented by Equation (12)(a):

$$\varepsilon_l = \Sigma_{i=0}^{K-1} a_i \varepsilon_{l,i} \quad (12)(a)$$

where $a_i$ is a real-valued scalar of tap i. In other words, the input $\varepsilon_l$ to loop filter 830 which drives the PLL is determined as a linear combination of per-tap phase. Since the per tap $\varepsilon_{l,i}$ can be represented as Equation 12(b):

$$\varepsilon_{l,i} = \omega_i l - \varphi_l \quad (12)(b)$$

then $\varepsilon_l$ may also be represented by Equation (12)(c):

$$\varepsilon_l = \tilde{\omega} l - \varphi_l \Sigma_{i=0}^{K-1} a_i \quad (12)(c)$$

where $\tilde{\omega} = \Sigma_{i=0}^{K-1} a_i \omega_i$. In other words, the loop filter input $\varepsilon_l$ in FIG. 8 is essentially equivalent to the case in which $y_l = A_l e^{j\tilde{\omega} l}$. The PLL of FIG. 8 can maintain a constant $\varepsilon_l$ so that the PLL can track $\tilde{\omega}$.

Although the modified PLL of FIG. 8 can track the corresponding $\tilde{\omega}$, such tracking is only useful if there is an appropriate/suitable value of the scalar $a_i$. Appendix A of the '863 provisional discusses the details, advantages, and disadvantages for selecting a 'good' value of $a_i$ based on performance and metrics such as inter-carrier-interference (ICI) and channel interpolation. In the conclusion of Appendix A of the '863 provisional, two specific choices of $a_i$ were presented, as shown by Equations (13)(a) and (13)(b) below:

$$a_i = \frac{p_i}{\sum_{i=0}^{K-1} p_i} \quad (13)(a)$$

$$a_i = \frac{\sqrt{p_i}}{\sum_{i=0}^{K-1} \sqrt{p_i}} \quad (13)(b)$$

As discussed in Appendix A of the '863 provisional, Equation 13(b) seemed to have a more sufficient analytical justification and, according to simulations, provided a better packet error rate performance. Using the guidance provided here and in the '863 provisional, one of ordinary skill in the art should be able to derive other formulae for $a_i$ based on the metrics of the specific implementation, system, environment, etc.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, FIGS. 3-6 and 8 are simplified representations of the actions performed, their descriptions herein simplified overviews, and real-world implementations would be much more complex, require more stages and/or components, and would also vary depending on the requirements of the particular implementation. Being simplified representations, FIGS. 3-6 and 8 do not show other required steps as these are known and understood by one of ordinary skill in the art and may not be pertinent and/or helpful to the present description.

Similarly, FIGS. 3 and 8 are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure.

In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A user equipment (UE) capable of channel estimation in a high-speed single-frequency network (HS-SFN), comprising at least one non-transitory computer-readable medium; and at least one processor, which, when executing instructions stored on the at least one non-transitory computer-readable medium, causes the UE to perform a method comprising:

calculating an estimated frequency offset (FO) correction for a received signal using at least an FO estimation generated by an automatic frequency control (AFC) module using at least a previously-calculated channel estimate output from a channel estimator (CE) as input in a first feedback loop; and calculating, by the CE, a current channel estimate using at least the received signal adjusted by the estimated FO correction from the first feedback loop and one or more channel parameter estimates generated by the AFC using at least the previously-calculated channel estimate output from the CE as input in a second feedback loop.

2. The UE of claim 1, wherein the one or more channel parameter estimates comprise a per-tap frequency offset estimation for each tap in each orthogonal frequency division multiplexing (OFDM) symbol.

3. The UE of claim 2, wherein calculating the current channel estimate comprises:
   calculating interpolation coefficients to interpolate frequency domain (FD) channel values using the per-tap frequency offset estimations.

4. The UE of claim 1, wherein the one or more channel parameter estimates comprise (i) a per-tap frequency offset estimation for each tap in each orthogonal frequency division multiplexing (OFDM) symbol, (ii) a per-tap channel power estimate, (iii) a per-tap delay estimate, and (iv) a noise variance estimate.

5. The UE of claim 4, wherein calculating the current channel estimate comprises:
   calculating minimum mean square error (MMSE) estimations using at least channel parameter estimates (i) through (iv).

6. The UE of claim 5, wherein the method performed by the UE further comprises:
   obtaining a raw channel impulse response (CIR) of the received signal.

7. The UE of claim 6, wherein calculating the current channel estimate further comprises:
   calculating MMSE combining weights for each tap using at least the four channel parameter estimates (i) through (iv); and
   performing MMSE combining using the raw CIR and the MMSE combining weights.

8. The UE of claim 5, wherein the method performed by the UE further comprises:
   obtaining a raw frequency domain (FD) channel of the received signal.

9. The UE of claim 8, wherein calculating the current channel estimate further comprises:
   calculating MMSE combining weights for each subcarrier using at least channel parameter estimates (i) through (iv); and
   performing MMSE combining for each subcarrier using the raw FD channels and the MMSE combining weights.

10. The UE of claim 8, wherein calculating the current channel estimate further comprises:
    calculating MMSE combining weights and performing MMSE combining on subsampled subcarriers using at least channel parameter estimates (i) through (iv) and the raw FD channels; and
    approximating an estimated FD channel based at least on the MMSE combining using MMSE combining weights calculated based on subsampled subcarriers.

* * * * *